F. T. CUMMINGS.
Steam-Generators for Heating Buildings.

No. 149,105. Patented March 31, 1874.

Witnesses,
Inventor,
Fredrick T. Cummings

F. T. CUMMINGS.
Steam-Generators for Heating Buildings.
No. 149,105. Patented March 31, 1874.

Witnesses: Inventor,
Fredrick T. Cummings

UNITED STATES PATENT OFFICE.

FREDRICK T. CUMMINGS, OF WATERTOWN, MASSACHUSETTS.

IMPROVEMENT IN STEAM-GENERATORS FOR HEATING BUILDINGS.

Specification forming part of Letters Patent No. 149,105, dated March 31, 1874; application filed March 11, 1874.

*To all whom it may concern:*

Be it known that I, FREDRICK T. CUMMINGS, of Watertown, in the county of Middlesex and State of Massachusetts, have invented an Improvement in Steam Boilers or Generators for Heating Buildings, of which the following is a full, clear, and exact description, reference being had to the accompanying drawings making part of this specification, in which—

Figure 1:
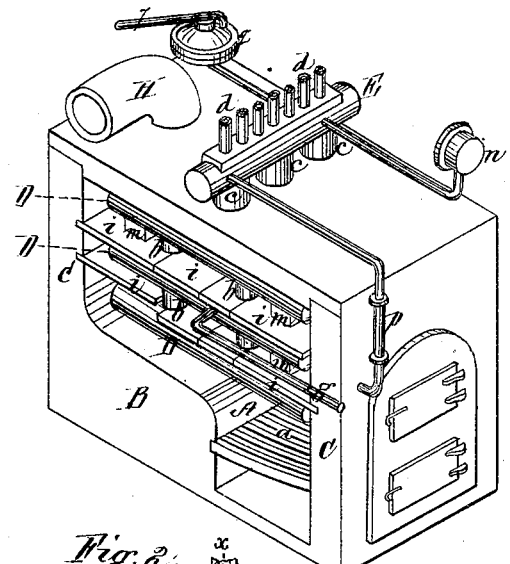
Figure 2:
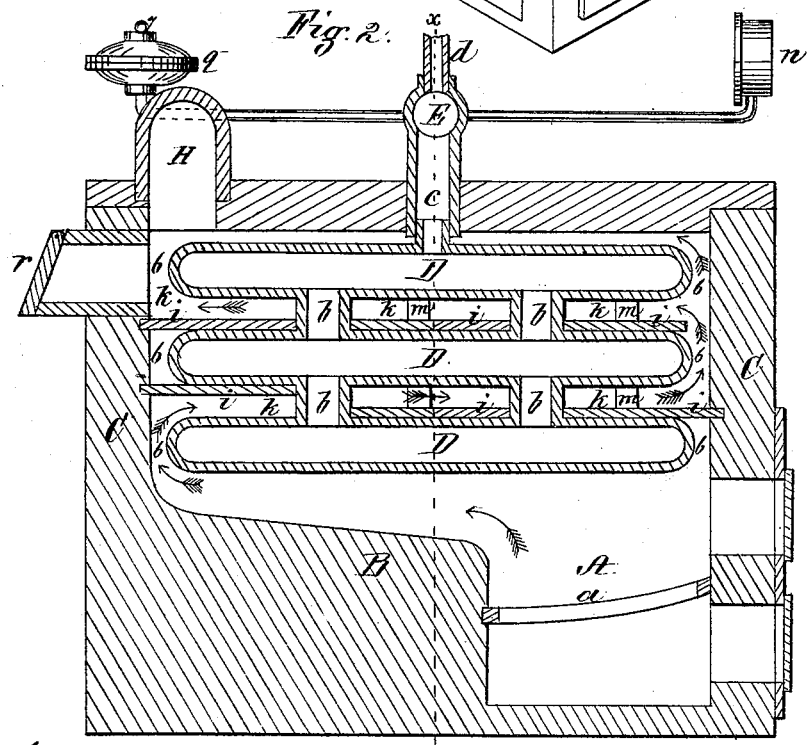
Figure 3:
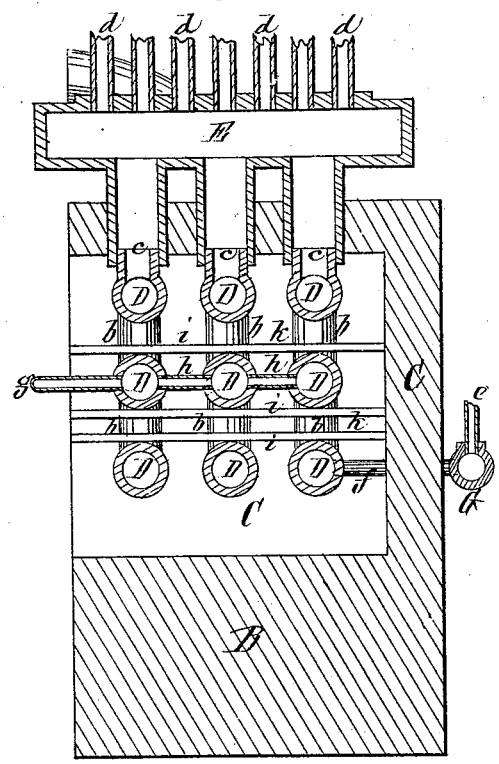
Figure 4:
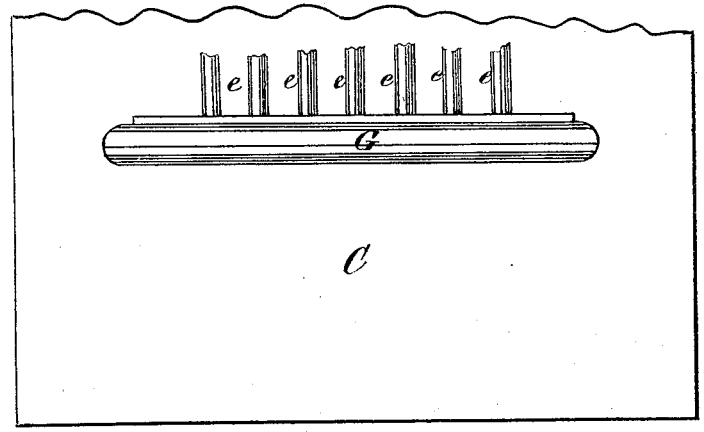

Figure 1 is a perspective view of a steam-generator constructed in accordance with my invention, one side being removed to show the interior construction. Fig. 2 is a vertical longitudinal section through the center of the same. Fig. 3 is a vertical transverse section on the line $x\ x$ of Fig. 2. Fig. 4 is an elevation of a portion of one side of the apparatus.

My invention has for its object to produce a cheap, simple, and compact boiler for heating purposes, which will generate steam rapidly, and with a very small consumption of fuel; and consists in a series of water-tubes, connected together and with a steam-chamber above, in combination with division-plates so arranged between the tubes as to form a circuitous flue, by which the flame and other heated products of combustion are retarded in their passage from the fire-box to the chimney, and retained in contact with the water-tubes, which are thereby quickly heated, so as to generate steam in a rapid and economical manner.

To enable others skilled in the art to understand and use my invention, I will proceed to describe the manner in which I have carried it out.

In the said drawings, A represents the fire-box, $a$ the grate-bars, and B the bridge-wall, above which, and within the brick walls C, are supported a number of tubes, D, for containing water, a space, 6, being left between the end of each tube and the adjacent wall C. Three of these tubes, D, are united together by short connecting-pipes $b$, and three series of tubes are arranged side by side at a short distance apart. The upper tube D of each series is connected by a vertical pipe, $c$, with a chamber, E, placed above the brick-work to receive the dry steam, the steam, as it is generated, rising into this chamber, from which it passes by pipes $d$ to the radiators in various parts of the building to be heated. The waste steam and water produced by condensation are returned by pipes $e$ to a chamber, G, connected with one of the lower tubes D by pipes $f$. The tubes D are supplied with fresh water through a pipe, $g$, which enters one of the middle tubes, the several series of tubes being connected together by small pipes $h$, which allow the water to circulate freely, and rise or fall equally in all of the tubes. The lower tubes D are placed close to the bridge-wall B, so as to leave only a flue-space, and bring them as near to the fire as possible. $i$ are division-plates, which are placed between the tubes D, and so arranged as to form a circuitous flue or passage, $k$, through which the flame and other heated products of combustion pass to the chimney H, as indicated by the arrows, being thus retarded in their passage and brought into contact with the entire length of every tube D, imparting a great amount of heat thereto, which would be wasted if it were allowed to pass directly from the fire-box to the chimney.

By this construction steam is generated rapidly with very little fuel, and a great saving is thus effected.

The division-plates $i$ are made in sections to allow of expansion and contraction, and are intended to be set into the brick-work to enable them to serve as supports for the tubes D, which rest on blocks $m$, placed between the plates and the under sides of the tubes.

Instead of a series of three tubes D, placed one above the other, as shown, and connected together by pipes $b$, a series of two tubes only, or more than three, may be used, if preferred; and, if it is desired to make the apparatus wider, the number of series of tubes may be increased.

$n$ is the steam-gage, $p$ the water-gage, and $q$ the regulator, the lever 7 of which is intended to be connected with the damper $r$, by which means the fire can be automatically regulated, as desired.

What I claim as my invention, and desire to secure by Letters Patent, is—

The within-described steam-generator, consisting of the tubes D, connected together and with the steam-chamber E, in combination with the fire-box A and division-plates $i$, arranged between the tubes D to form a circuitous flue, $k$, the whole constructed and operating substantially as set forth.

Witness my hand this 5th day of March, A. D. 1874.

FREDRICK T. CUMMINGS.

In presence of—
    P. E. TESCHEMACHER,
    N. W. STEARNS.